United States Patent
Galyas et al.

[11] Patent Number: 6,138,020
[45] Date of Patent: Oct. 24, 2000

[54] QUALITY-BASED HANDOVER

[75] Inventors: Johan Karoly Peter Galyas, Täby; Stig Roland Bodin, Spånga; Lars Kalle Lindén, Hästveda; Lars Magnus Lindroth, Stockholm, all of Sweden

[73] Assignee: Telefonaktiebolaget LM Ericsson, Stockholm, Sweden

[21] Appl. No.: 08/938,611

[22] Filed: Sep. 26, 1997

[30] Foreign Application Priority Data

Sep. 30, 1996 [SE] Sweden ................................ 9603560

[51] Int. Cl.⁷ ........................................ H04Q 7/22
[52] U.S. Cl. .................. 455/436; 455/439; 455/445; 455/450; 455/560; 455/561; 370/331; 370/468
[58] Field of Search ..................... 455/436, 438, 455/439, 445, 450, 451, 452, 524, 560, 561; 370/329, 330, 331, 332, 341, 344, 468

[56] References Cited

U.S. PATENT DOCUMENTS 5,550,828  8/1996  Gries et al. ........................ 370/329
5,722,074  2/1998  Muszynski ........................ 455/442

*Primary Examiner*—Lee Nguyen
*Attorney, Agent, or Firm*—Burns, Doane, Swecker & Mathis, L.L.P.

[57] ABSTRACT

The present invention relates to the technique of handover in mobile telephony. A new Transcoder and Rate Adaptation Unit (100 FIG. 3) is introduced which provides two uplink (230, 250 respectively, FIG. 3) and two downlink (240, 260 respectively, FIG. 3) channels. The use of these two channels (230, 250 respectively, FIG. 3) on the uplink during handover provides for the use of distributed handover on the uplink. The result minimizes the audible interruption during handover by minimizing the loss of Traffic Channel frames to what is possible within the GSM standard. Additionally, interruption of the speech or background noise during these lost frames is masked by an error concealment algorithm, since the Transcoder and Rate Adaptation Unit (100 FIG. 3) still has information from the Base Transceiver Station responsible for transmission before the handover.

8 Claims, 7 Drawing Sheets

QUALITY-BASED HANDOVER

FIELD OF THE INVENTION

The present invention relates generally to the technique of handover in mobile telephony, and more particularly to the use of distributed handover in the uplink direction.

RELATED ART

In a typical mobile telephony system the architecture is distinguished into two parts: a Base Station Sub-System and a Switching Sub-System. The Base Station Sub-System is in charge of providing and managing transmission paths between a Mobile Station, or a plurality of Mobile Stations, and the Switching Sub-System machines. A machine in the Switching Sub-System is typically called a Mobile Switching Center. The Base Station Sub-System manages the radio transmission over the air interface between the Mobile Stations and the rest of the mobile system. The Switching Sub-System must manage communications and connect Mobile Stations to the relevant external networks(e.g. the Public Switched Telephone Network). The Switching Sub-System is not in direct contact with a Mobile Station and neither is the Base Station Sub-System in direct contact with an external network.

The role of the Base Station Sub-System can be summarized as to connect the Mobile Station with other telecommunications users. On one side of the Base Station Sub-System is the mobile Switching Center, and there the Base Station Sub-System is in direct contact with the switches of the Mobile Switching Center. On the opposite side of the Base Station Sub-System is the Mobile Station, and there the Base Station Sub-System is in direct contact with the Mobile Station using radio transmission over what is sometimes called the Air Interface.

The Base Station Sub-System includes two types of machines: a Base Transceiver Station, in contact with the Mobile Station through radio transmission over the Air Interface, and the Base Station Controller, the latter being in contact with both the switches of the Switching System and the Base Transceiver Station. It is largely a functional split between transmission equipment, the Base Transceiver Station, and its managing equipment, the Base Station Controller. In GSM vocabulary, one Base Station Sub-System means a set of one Base Station Controller and all Base Transceiver Stations under its control.

The interface between the Base Station Controller and the Mobile Switching Center, the MSC-BSC interface, is often called the A-Interface. It is called this in the GSM ("Global System for Mobile Communications") system and will be referred to as such in this description. The interface between the Base Station Controller and the Base Transceiver Station, the BSC-BTS interface, is labeled the Abis-Interface in GSM and will be referred to as such here.

The Base Transceiver Station comprises radio transmission and reception devices, up to and including antennas, and also all the signal processing specific to the radio interface. An important component in the Base Transceiver Station of the GSM architecture is the TRAU ("Transcoder and Rate Adaptation Unit"). The TRAU is the equipment in which the speech encoding and decoding is carried out, as well as rate adaptation in case of data. In all prior approaches, each Base Transceiver Station is allocated a separate TRAU for each speech "channel" being used by each Mobile Station within the cell covered by that Base Transceiver Station. This is an important distinction in the case of handovers, as mentioned below.

The concept of a "channel" is important in mobile communications. The main responsibility of a communication system is to transport user information, whether speech or data. In order to limit the use of the radio spectrum, speech in digital systems such as GSM is represented by a binary signal transported over particular radio frequencies. The user should be able to access this information by looking at the particular frequency and time at which the information is being broadcast. This particularly identified portion of the interface, the time and the frequency, is a "channel".

In systems that use only Frequency Division Multiple Access (FDMA), a channel is identified with a particular frequency. In Time Division Multiple Access (TDMA) systems where the stream or bits are broadcasted over time, the time axis can be divided into shorter periods which can then be associated with particular channels. In addition, Frequency Hopping can be used, where the transmission is "hopped" from one frequency to another and the "channel" is then the sequence of frequencies hopped to.

GSM, and other systems, use a mixture of FDMA, TDMA and Frequency Hopping. A basic concept in GSM is that the unit of transmission is a series of about a hundred modulated bits, and is called a burst. Bursts have a finite duration, and occupy a finite part of the radio spectrum. They are sent in time and frequency windows that are sometimes called slots. "Timeslot" is sometimes used to mean the slot, its time value, or also the cycle using one slot every eight slots in time.

To use a given "channel" in GSM means to transmit bursts at specific instants in time, at specific frequencies. To define a "channel" consists then in specifying which slots can be used by, or are part of, the channel. A channel therefore has a temporal definition giving, for each time slot, the number of slots which are part of the channel. The temporal definition is also cyclic, that is to say it repeats itself over time. In parallel to the time definition, the frequency definition of a channel gives the frequency of every slot belonging to every channel. It consists basically of a function allocating a frequency to each time slot where a channel has a slot. There exist fixed frequency channels and frequency hopping channels.

Although channels are defined by reference to their time and frequency, they may also be referred to by their function. A speech channel is a bi-directional channel that is devoted to the user's call during its duration. These are also sometimes referred to as Traffic Channels. In addition to user data, signalling messages must also be conveyed to support the ongoing call, including support for handovers.

In GSM, the system actually steals information from the speech channel to support the handover. This particular use of the Traffic Channel is called the Fast Associated Control Channel (FACCH) in GSM. The FACCH is then just a particular use of a Traffic Channel wherein a frame of speech is stolen to transmit signalling information. The receiver is then able to distinguish both types of uses of the Traffic Channel by reading binary information sent on the Traffic Channel which is called the stealing flag.

Returning to the TRAU, although the specifications of GSM consider the TRAU as a sub-part of the Base Transceiver Station, it can be sited away from the Base Transceiver Station, and may be placed anywhere from the Base Transceiver Station to the Mobile Switching Center itself. However, a more centralized position closer to the Mobile Switching Center will save more transmission resources and, therefore, costs. As discussed below, the TRAU acts as a gateway between the 64 kbit/s transmission on the Public Switched Telephone Network ("PSTN") and the lower rate of the mobile network. There must be terrestrial links between the Mobile Switching Center ("MSC") and the Base Transceiver Station ("BTS"). These links can therefore carry traffic at either the lower rate of the mobile part or the higher rate, which is more expensive, of the PSTN.

The costs of these internal terrestrial links (between the Base Transceiver Station and Base Station Controller, and between the Base Station Controller and the Mobile Switching Center), usually leased by the operator, represents a substantial part of the operation cost. A transmission method using only 16 kbit/s for user data (signalling is kept on 64 kbit/s links) leads to a cost reduction, although it introduces some extra delay for the transmission, and hence lowers the overall speech transmission quality. Having the gateway between 16 kbit/s and 64 kbit/s, the function of the TRAU, closer to the Mobile Switching Center will save more of these fixed line costs.

In the current phase of GSM the incoming signal from a Mobile Station is transmitted at a rate of 13 kbit/s. The next GSM phase allows the use of different algorithms to compress speech into even lower bit rates. For example, advanced speech coders will cut down the present bit rate from 13 kbit/s to 5.6 kbit/s and speech will be transmitted on so-called half-rate channels. However, the standard used for transmission in the fixed telephone network is 64 kbit/s. Every mobile telephony system must therefore have some means of switching all the incoming 13 kbit/s Mobile Station signals into a 64 kbit/s signal sent to the fixed telephone network. That is the function of what is called the TRAU in the present invention. Although this nomenclature is that of GSM, the present invention is applicable to all similar means used for speech coding and rate adaptation in other mobile telephony systems.

In a mobile telecommunications system the Mobile Station is allowed to move from one geographical location to another in a process that is referred to as "roaming". Because the area of coverage of a mobile system is divided into "cells", the Mobile Station roams from one cell to another. The radio transmission and reception for one cell is under the control of one Base Transceiver Station. Each different cell has its own Base Transceiver Station responsible for transmitting and receiving within that cell.

In the next step up in the hierarchy of the cellular structure of a mobile system, a group of cells is organized into a Location Area. This is the area in which a Mobile Station is located and then paged for an incoming call to the Mobile Station. All the cells in a Location Area may be under the control of one or more Base Station Controllers, but they belong to only one Mobile Switching Center. One Base Station Controller will usually control several Base Transceiver Stations, with each Base Transceiver Station covering a separate cell.

As the Mobile Station roams from one cell to another, it is often necessary to "handover" responsibility for control communications from one Base Transceiver Station to another. The Base Transceiver Station in control of the radio interface to the cell occupied before the handover can be called BTS-old. The Base Transceiver Station responsible for the radio interface in the cell occupied after the handover can be called BTS-new.

Handovers are often distinguished by the switching point where there are 3 cases: first, BTS-new is controlled by the same Base Station Controller as BTS-old; second, BTS-new is controlled by a different Base Station Controller from BTS-old but by the same Mobile Switching Station; and finally, BTS-new is controlled by a different Mobile Switching Center and Base Station Controller from BTS-old.

A handover from one cell to another is called an "intercell" handover and responsibility is handed over from one Base Transceiver Station to another. An intercell handover where the same Base Station Controller retains control is referred to as an "intra-BSC" handover. An intercell handover where BTS-new is under the control of a different Base Station Controller is called an "inter-BSC" handover. There also are "intra-cell" handovers" where responsibility is handed over from the Base Transceiver Station to itself, but from one channel to another. All the handovers in this paragraph are "intra-MSC" handovers since the same Mobile Switching Center retains control before and after the handover. It is these intra-MSC handovers with which the present invention is concerned.

A handover may be executed for different reasons. These reasons include, among others, weakened signal strength, increased bit error rate for the transmission, increased propagation path loss, and increased propagation delay. In most cases, the decision to attempt the handover of a given Mobile Station is taken by the Base Station Controller, although occasionally by the Mobile Switching Center. Once the decision is taken, and once the new cell is chosen, the actual transfer must be coordinated between the Mobile Station and the radio transmitting and receiving machines managing the old cell (BTS-old) and the new cell (BTS-new)

Handovers can also be distinguished in other ways. As the Mobile Station roams through the cell system the delay in transmission to and from the Base Transceiver Station will vary. A mechanism is designed to compensate for this delay in the GSM system. To compensate for the delay, the Mobile Station advances its transmission time relative to its basic schedule, which is derived from the reception of bursts, by a time indicated by the infrastructure, the timing advance. The Base Transceiver Station continuously measures the time offset between its own burst schedule and the reception schedule of Mobile Station bursts. Based on these measurements, it is able to provide the Mobile Station with the required timing advance.

Where the transmission offset time between two Base Transceiver Stations is known, the two cells are said to be synchronized. Where the BTS-old and the BTS-new cell in a handover are synchronized, the handover is called "synchronous" handover. The Mobile Station is able to merely measure and derive the difference in propagation times from BTS-old and BTS-new to calculate the timing advance used to BTS-new after the handover.

In a handover between two cells which are not synchronized, no information can be used by either the BTS-new or the Mobile Station to predict the timing advance. The Mobile Station is forbidden to transmit its normal bursts unit it knows the timing advance of BTS-new. Because BTS-new must receive something from the Mobile Station to assess the propagation time, the Mobile Station is required to send "access" bursts with a null timing advance. In GSM these "access" bursts are sent on the Random Access Channel ("RACH"). With these access bursts, the BTS-new can calculate the timing advance This extended exchange between the Mobile Station and BTS-new lengthens the handover procedure between asynchronous cells, "asynchronous" handover, as compared to synchronized handover.

One problem with handovers is handover interruption time. Since the physical pathway for the transmission is being switched through various machines, there is inevitably some delay. This delay differs in different systems and it is one of the objects of the present invention to reduce this handover interruption time.

One prior approach to minimizing handover interruption time in the downlink direction was to introduce distributed handover in the downlink. The idea is to provide downlink speech to both the BTS-old and the BTS-new by using a broadcast facility in the switch. This will reduce the downlink handover interruption down to only the interruption caused by the Mobile Station, signalling over the air interface and delay due to interleaving.

In the uplink direction synchronous handover has been used to decrease handover interruption time, due to decreased signalling over the air interface. One way of using synchronous handover is to let BTS-new use the detection of the four RACH bursts sent by the Mobile Station as the criteria for sending the HANDOVER DETECTION message to the Base Station Controller in GSM.

Another solution using synchronous handover is to let BTS-new send the HANDOVER DETECTION message to the Base Station Controller at reception of a correctly decoded signalling frame or a correctly decoded TCH frame. In that case no RACH bursts are needed which reduces the uplink interruption time by 20 ms. Thus, if using this solution, the sending of RACH bursts will be turned off in the Mobile Station by the HANDOVER COMMAND. The Base Station Controller will use the reception of the HANDOVER DETECTION message to trigger the switching of the uplink channel. However, the reception of the HANDOVER DETECTION message will be at a point in time when the first speech frame on the traffic channel has already been transmitted, or is partly transmitted (i.e. the delay may be less than one frame), over the Abis interface. Therefore, the switching of the uplink channel may come too late, depending on the signal load and the particular implementation.

For an asynchronous handover, the tuning of a delay factor could come close to optimizing the switching point. A delay is needed since the Mobile Station will have to wait on the PHYSICAL INFORMATION message before sending anything on the allocated traffic channel. The resulting switching point will vary due to queuing of messages on the Abis interface in the Base Station Controller.

It is also known to use a facility in the switch to set up a conference call between BTS-old and BTS-new. This is a form of distributed handover, however the switching is done at 64 kbit/s and does not have the same advantages as the present invention, where the switching is done on the sub-rate level.

Another look can be taken at prior approaches to using TRAUs, and their non-optimal switching at Handover. First, when two TRAUs are used, if the switch is too early, the output from the old TRAU performing some masking based on the last received speech frame or the last received SID frame is cut. The new TRAU has no valid speech data or previous SID or speech information. It will then start sending silence. If the switch is too late then speech information is lost. Note that the accuracy is 125 μs since the switch is done on the PCM side of the TRAUs.

In those prior methods using one TRAU, if the switch is too early the output from the old TRAU, which is performing some masking based on the last received speech frame or the last received SID frame, continues until the first speech frame or SID frame is received from the new BTS. If the switch is too late speech information is lost. Note that the accuracy is 20 ms since the switch is done on the Abis side of the TRAU. This means that even if only a part of the frame is lost the whole 20 ms of speech information is lost. An additional problem with this solution is that the switching point is not aligned to the phase of the TRAU frames. At the switching point the TRAU will see the TRAU frames from the new BTS as a disturbance until re-synchronized to that new phase.

Although various approaches exist in minimizing handover interruption time, there is still room for improvement. It is still possible to optimize the switching point in the uplink direction, and one method of doing this is by introducing a distributed handover in the uplink direction.

SUMMARY OF THE INVENTION

The present invention uses the concept of a distributed handover to minimize interruption of the speech frames. This is similar to the idea of "soft handover" as used in CDMA. However, the present invention applies to a digital TDMA system such as the GSM system.

Instead of allocating a new TRAU to BTS-new in the handover, the present invention uses the same TRAU and the switching is done on the Abis side of the TRAU, at the full-rate of 16 kbit/s or the half-rate of 8 kbit/s in GSM, whether the TRAU is located at the Base Transceiver Station or anywhere more centrally, up to the Mobile Switching Center. The actual rate is not important, the present invention applies equally well to different systems, regardless of the rate of transmission on the BTS side of the TRAU. Although other systems exist using one TRAU for handover, they don't use the idea of the present invention, which is to have two uplink channels for a soft handover, wherein the best embodiment uses only one TRAU.

This new invention is applicable to both handovers between cells under the control of the same Base Station Controller, "intra-BSC" handovers, and handovers between cells under the control of different Base Station Controllers, "inter-BSC" handovers. It is also applicable to "intra-cell" handovers from one channel to another within the same Base Transceiver Station. It is also applicable to handovers with changed speech coding where the TRAU uses two different speech coders (e.g. bosh half-rate and full-rate), and both speech and data services will work with the present invention.

By keeping the same TRAU, the interruptions due to the switching of the uplink traffic can be more easily masked by the TRAU since the TRAU will have information stored from BTS-old about the speech frames being transmitted. Since the uplink handover interruption with synchronous handover could be as short as 40–60 ms under ideal conditions, the TRAU will likely be generating partly muted speech from BTS-old, or perhaps comfort noise, based on the data received from BTS-old.

In the present invention, switching in the uplink will be done by the TRAU based on the quality of the received data from both BTS-old and BTS-new. This new TRAU will have two inputs and two outputs on the Abis interface, instead of one input and one output as in the TRAUs used in present systems. It will also have one input and output on the A interface as in present systems. This modified TRAU will run two Abis protocols in parallel, independent of each other, on an Abis channel A and an Abis Channel B.

An object of the design of the present invention is to minimize the loss of speech frames on the traffic channel to what is possible within the GSM standard. Time is only lost for frames stolen for signalling over the Air Interface, the time taken by the Mobile Station to physically change to BTS-new, and delay due to interleaving.

Another object of the present invention is to mask any lost frames by an error concealment algorithm since the TRAU already has information from BTS-old.

Yet another object of the present invention is to avoid the use of a broadcast facility in the switch or sub-rate switch which can cause some disturbances at connection or disconnection. The broadcast function can then be used for monitoring the traffic.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

The present invention applies to both intra-BSC handovers and inter-BSC handovers. The embodiment described here will focus on an intra-BSC handover, from one Base Transceiver Station controlled by a Base Station Controller to another Base Transceiver Station controlled by the same Base Station Controller.

Typically, the Base Station Controller makes all necessary decisions regarding intra-BSC handovers, including allocation of radio resources and terrestrial lines. However, it is possible for the Mobile Switching Center to have responsibility for the handover decision. In the preferred embodiment of the current invention, the TRAU is located at the Mobile Switching Center site, although it could be located more peripherally at the Base Station Controller or the Base Transceiver Station.

In prior approaches with the TRAU located at the Base Station Controller site, each conversation to and from a Mobile Station had both the uplink and downlink channels for that conversation controlled by one TRAU. When a handover was made from one Base Transceiver Station to another Base Transceiver Station, responsibility for speech coding for both the uplink and downlink channels were transferred to a second TRAU which would handle the speech frames to and from BTS-new.

One aspect that distinguishes the current invention from prior approaches is that only one TRAU is used wherein the switching is done on the A-bis side at 16 kbit/s and that TRAU is connected to two Base Transceiver Stations at the same time during handover. Prior approaches used either two TRAUs for the handover where the switching was done at 64 kbit/s, or one TRAU where the switching was done at 16 kbit/s and that one TRAU was connected to only one Base Transceiver Station at a time during handover. Both approaches provided a less than optimal switching point for the handover. In the present invention new terrestrial resources must be allocated to transfer the signal from the TRAU to BTS-new, although only one TRAU is needed for speech coding and rate adapting for both BTS-old and BTS-new.

Figure 1:
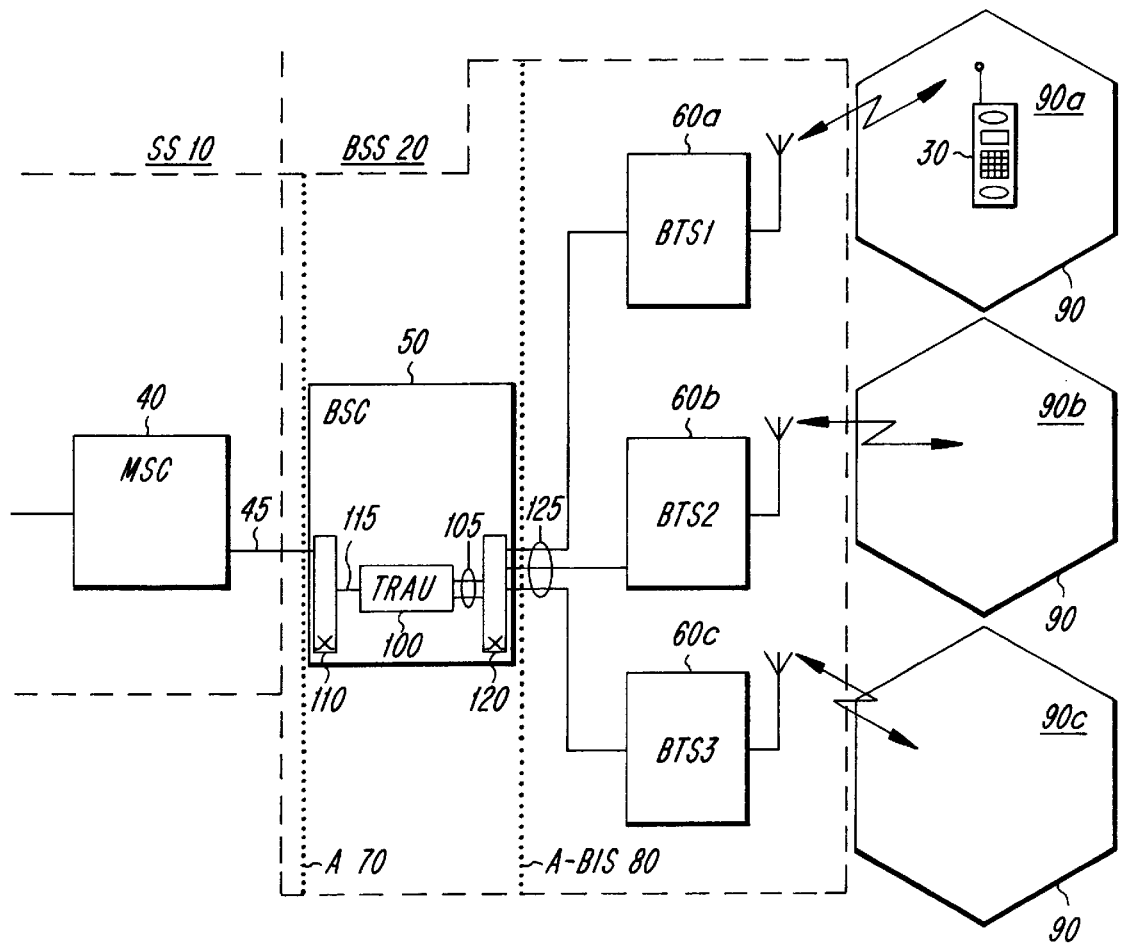
FIG. 1 is an overview of a mobile communications system including the various essential elements and the placement of the present invention in relation to those elements wherein the Transcoder and Rate Adaptation Unit ("TRAU") is located at the Base Station Controller.

A simplified overview of a mobile communications system is shown in FIG. 1. The division of the system into a Switching System ("SS") 10 and a Base Station Sub-system ("BSS") 20 are shown. As indicated previously, the Base Station Sub-System 20 manages the radio interface between the Mobile Station 30 and the rest of the mobile communications system. The Switching System 10 manages the connection of the mobile communications system with external networks, such as the Public Switched Telephone Network ("PSTN").

The heart of the Switching System 10 is a Mobile Switching Center ("MSC") 40 which is in direct contact with a Base Station Controller ("BSC") 50. The Base Station Controller 50 is then in contact with at least one Base Transceiver Station ("BTS") 60a–60c. Shown here are three Base Transceiver Stations, BTS1 60a, BTS2 60b, and BTS3 60c, although there can be any number of Base Transceiver Stations 60a–60c. These Base Transceiver Stations 60a–60c are then in direct contact with a Mobile Station 30 which is located in the geographic area covered by this particular Base Station Controller 50.

A distinction which has been made in the GSM system is the interface between the Mobile Switching Center 40 and the Base Station Controller 50, the MSC-BSC interface, which is called the A Interface ("A") 70 in GSM. The interface between the Base Station Controller 50 and the Base Transceiver Stations 60a–60c, the BSC-BTS interface, is called the A-bis Interface ("A-BIS") 80 in GSM. In most systems the communication over these interfaces is carried out along terrestrial lines, while the communication between the Base Transceiver Stations 60a–60c and the Mobile Station 30 is carried out over an air interface using radio transmission.

Communication over the standard fixed telephone network ("PSTN") is at 64 kbit/s, while that over the air interface is usually much lower in order to conserve bandwidth. In GSM the Mobile Station 30 is transmitting at an effective rate of 22.8 kbit/s to each Base Transceiver Station 60a–60c, which in turn first removes the channel coding bits, which reduces the rate down to 13 kbit/s, and then adds various signalling information to raise the bandwidth of each channel to the Base Station Controller 50 to 16 kbit/s. The purpose of the Transcoder and Rate Adaptation Unit ("TRAU") 100 is to serve as the gateway function between the 16 kbit/s rate and the 64 kbit/s rate.

Figure 1A:
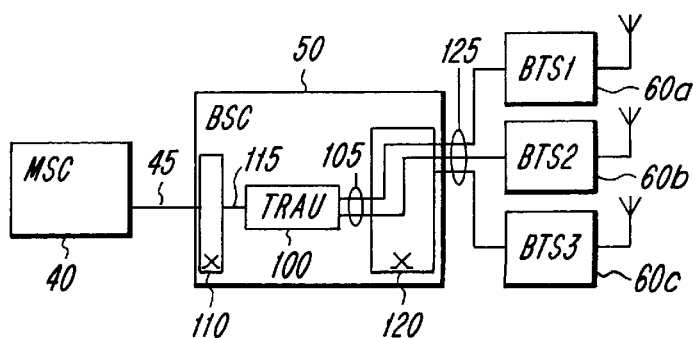
FIG. 1a is a more detailed view of the switching involved in the mobile communications system of FIG. 1.

FIG. 1a shows a more focused view of the switching according to the present invention. A TRAU 100 is connected to two switches, a 64 kbit/s switch 110 and a 16 kbit/s switch 120. Although only one TRAU 100 is shown, there will usually be a plurality of TRAUs at the same site, depending on the implementation and requirements of the system. The 16 kbit/s switch 120 has lines 125 going to each Base Transceiver Station 60a–60c under the control of this particular Base Station Controller 50. Three separate lines 125 are shown here, one for each Base Transceiver Station 60a–60c. The 16 kbit/s switch is under the control of the Base Station Controller 50 and controls the routing of signals between the TRAU 100 and the Base Transceiver Station 60a–60c. When the Mobile Station 30 roams from Cell to Cell 90a–90c handovers will be performed and during this procedure the 16 kbit/s switch will rouse the signals so that transmission will occur between the TRAU 100 and the necessary Base Transceiver Station 60a–60c.

Each TRAU 100 has two lines 105 between it and the 16 kbit/s switch 120. This is one aspect that distinguishes the present invention from the prior art. Prior approaches had only one line 105 allocated between the TRAU 100 and the 16 kbit/s switch 120 during a handover. As will be shown later, during handover the TRAU 100 has two uplink and two downlink channels allocated simultaneously during the procedure. These two pairs of channels are carried over these two lines 105, one pair of uplink and downlink channels for each line 105.

One pair of uplink and downlink channels will then be switched by the 16 kbit/s switch 120 to the Base Transceiver Station 90a–90c communicating with the Mobile Station 30 before Handover. The other pair of uplink and downlink channels will be switched to the Base Transceiver Station 90a–90c which will be responsible for communication with the Mobile Station 30 after the completion of the handover. The function of the 16 kbit/s switch 120 is clearly shown in FIG. 1a. In the present invention there will be two lines 105 between the TRAU 100 and the 16 kbit/s switch 120, each carrying an uplink and a downlink channel. The switch 120 switches these two lines 105 to two of the corresponding lines 125, three are shown here, between the 16 kbit/s switch 120 and two of the corresponding Base Transceiver Stations 60a–60c.

Another switch is also shown in FIG. 1. This is a 64 kbit/s switch 110. There is one line 115 between each TRAU 100 at this BSC 50 site and this 64 kbit/s switch 110. Every call involving a Mobile Station 30 must be switched up to 64 kbit/s before being sent along the correct path. Shown here is a line 45 between the 64 kbit/s switch 110 and the Mobile Switching Center 40. The Mobile Switching Center 40 will then route the call to the PSTN or perhaps to another Base Station Controller within this mobile system.

In situations where the Mobile Station 30 is communicating with another Mobile Station within the coverage area of the same Base Station Controller 50 the 64 kbit/s switch 110 can then merely switch to another TRAU within the same Base Station Controller 50 without first switching up to the Mobile Switching Center 40. However, even calls between mobile stations within the same cell must each be first switched up to 64 kbit/s in GSM before being sent to the other mobile station. Although in the embodiment shown here the transmission is at 64 kbit/s (lines 45, 115) and 16 kbit/s (lines 105, 125), this is specific to the GSM system. The present invention is not limited to these rates and will work equally well in similar systems using different transmission rates.

In the embodiment shown in FIGS. 1 and 1a, the TRAU 100 is located at the same physical location as the Base Station Controller 50. However, the invention is also applicable in embodiments where the TRAU 100 is physically placed at other locations. The TRAU 100 may be located in different places along the transmission chain, between the Base Transceiver Stations 60a–60c and the Mobile Switching Center 40. Functionally, the TRAU 100 belongs to the site of the Base Transceiver Stations 60a–60c, and is part of the A-bis Interface 80 according to the GSM Specifications.

Figure 2:
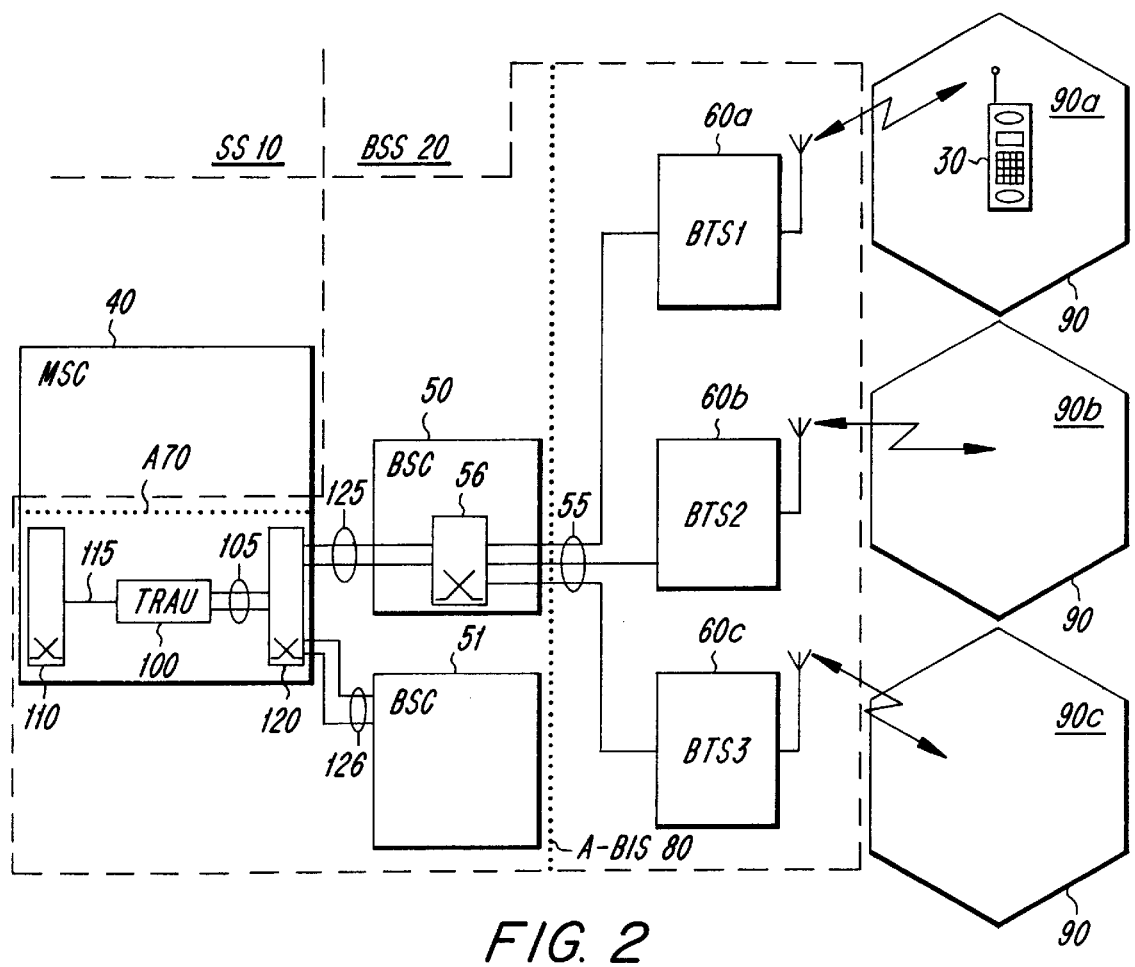
FIG. 2 is an overview of a mobile communications system including the various essential elements and the placement of the present invention in relation to those elements wherein the Transcoder and Rate Adaptation Unit ("TRAU") is located at the Mobile Switching Center.

FIG. 2 shows the preferred embodiment where she TRAU 100 is placed at the site of the Mobile Switching Center 40. The Base Station Controller 50, as a functional unit, is then 'spread' over its own site and the site of the Mobile Switching Center 40, and includes the link 125 between these two sites. Conversely, the A Interface 70, indicated by the dotted line, is then situated on the site of the Mobile Switching Center 40, over a very short distance. As can be seen in FIG. 2, as compared with FIG. 1, the A-interface 70 in the preferred embodiment is actually located at the physical site of the Mobile Switching Center 40. The reason for the somewhat artificial definitions of the various interfaces was to avoid the option of transporting data at 16 kbit/s or 64 kbit/s on the A Interface 70.

As a consequence, since the GSM Specifications do not strictly allow the functional placement, although they do allow a physical placement, of the TRAU 100 in the Mobile Switching Center 40, every call between two GSM users must undergo two transformations from 16 kbit/s to 64 kbit/s and back again. Thus every call involves two transcoding operations, and therefore two TRAU units 100, one for each GSM user.

Similar to the embodiment in FIGS. 1 and 1a, in the preferred embodiment of FIG. 2 there are two switches 110, 120, located at the Mobile Switching Center 40 and associated with the TRAU 100. These are a 64 kbit/s switch 110 with a 64 kbit line 115 between it and the TRAU 100, and a 16 kbit/s switch 120 with lines 105 carrying at 16 kbit/s. These function similarly to their implementation in the previous embodiment of FIGS. 1 and 1a, where they were located in the Base Station Controller 50.

One major difference in this preferred embodiment, as compared with the embodiment in FIG. 1a, is that the 16 kbit/s switch 120 doesn't switch between different Base Transceiver Stations 60a–60c. Rather, it switches between different Base Station Controllers 50, 51. Shown here are two Base Station Controllers 50, 51, although there could be more. There are groups of lines 125, 126 that transport the speech or data between the 16 kbit/s switch 120 and the Base Station Controllers 50, 51. Within the Base Station Controller 50 is also located a 16 kbit/s switch 56 that switches signals to and from the appropriate Base Transceiver Stations 90a–90c over 16 kbit/s lines 55.

The geographical area controlled by one Base Transceiver Station 60a–60c is referred to as a Cell 90. Shown here are three different Cells, 90a–90c. These Cells 90a–90c are under the control of one Base Station Controller 50, but separate Base Transceiver Stations 60a–60c. A Mobile Station 30 in the first Cell 90a will receive transmissions from, and transmit to, BTS1 60a. Similarly, when the Mobile Station 30 is in the second Cell 90b it will receive from and transmit to BTS2 60b, and when the Mobile Station 30 is in the third Cell 90c it will receive from and transmit to BTS3 60c.

As the Mobile Station 30 roams from Cell to Cell, it is often necessary for the responsibility for radio transmissions over the air interface to be handed over from one Base Transceiver Station to another. For example, when the Mobile Station 30 moves from the geographic area of the first Cell 90*a* to the second Cell 90*b*, the control of the radio transmissions over the air interface will be handed over from BTS1 60*a* to BTS2 60*b*. If the Mobile Station 30 roams frequently from one Cell 90*a*–90*c* to another there can be frequent interruptions due to handovers.

Figure 2A:
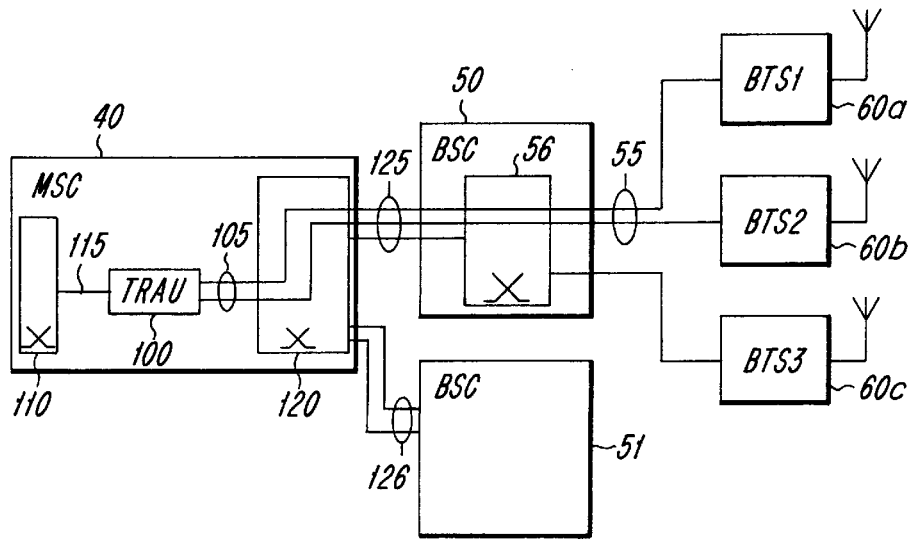
FIG. 2a is a more detailed view of the switching involved in the mobile communications system of FIG. 2.

In the method of the present invention as described below, the TRAU 100 can be located at either the Base Station Controller 50 site, as shown in FIGS. 1 and 1*a*, or at the Mobile Switching Center, as shown in FIGS. 2 and 2*a*. The TRAU 100 is an essential unit involved in handovers. As the Mobile Station 30 roams through the geographic area covered by the Base Station Controller 50 it is often necessary for the Base Station Controller 50 to switch control for the communication to the Mobile Station 30 between the various Base Transceiver Stations 60*a*–60*c*. This is performed by the 16 kbit/s switch, 120 in FIGS. 1 and 1*a* or 56 in FIGS. 2 and 2*a*, located at the Base Station Controller.

One of the essential functions of the Base Station Controller 50 is to control the switching between the various Base Transceiver Stations 60*a*–60*c* under its control. In the embodiment shown in FIGS. 2 and 2*a*, the Base Station Controller 50 will still control the switching done by the TRAU 100 by using its 16 kbit/s switch. It is possible for other embodiments, not shown, to have the switching controlled by the Mobile Switching Center 40 rather than the Base Station Controller 50.

FIG. 2*a* shows a more focused view of the switching of the preferred embodiment of the present invention. The preferred embodiment shown in FIG. 2*a* illustrates an intra-BSC handover. During the handover according to the present invention there will be two pairs of uplink and downlink channels occupied simultaneously for each TRAU 100. These two pairs will occupy the two 16 kbit/s lines 105 between the TRAU 100 and the 16 kbit/s switch 120 at the Mobile Switching Center 40 site, one pair of channels for each line 105. They will also occupy two of the 16 kbit/s lines 125 between the 16 kbit/s switch 120 in the Mobile Switching Center 40 and the 16 kbit/s switch 56 in the Base Station Controller 50. They will also occupy two 16 kbit/s lines 55 between the Base Station Controller 50 and two of the Base Transceiver Stations 60*a*–60*c*.

The responsibility of the 16 kbit/s switch 120 at the MSC 40 site is to route the two lines 105 coming from the TRAU 100 to the correct Base Station Controller 50. In the intra-BSC handover shown here the two lines 105 will be routed to the same BSC 50. The 16 kbit/s switch 56 in this BSC 50 will then route these two pairs of channels on the correct two lines 55 to the correct two Base Transceiver Stations 60*a*–60*b*. This shows some of the advantages of the preferred embodiment, where more of the transmission is done at 16 kbit/s rather than 64 kbit/s.

Although FIGS. 2 and 2*a* show an intra-BSC handover, the invention also works for an intra-MSC handover. The second Base Station Controller 51 will also have similar switching as the first Base Station Controller 50 and will have control over similar Base Transceiver Stations, not shown. If the Mobile Station 30 roams from a Cell 90*a*–90*c* in the area of control of the first Base Station Controller 50 to a Cell, not shown, under the control of the second Base Station Controller 51, a handover according to the present invention can still be performed. Again, two pairs of uplink and downlink channels will be used during the handover. Also, two 16 kbit/s lines will be used for these channels between the TRAU 100 and the Base Transceiver Stations.

During the handover the 16 kbit/s switch 120 located at the Mobile Switching Center 40 site will switch one pair of the channels to the first Base Station Controller 50 over one of the lines 125 between the Mobile Switching Center 40 and the first Base Station Controller 50. The 16 kbit/s switch 56 in the first Base Station Controller 50 will then switch the first pair of channels to the correct Base Transceiver Station 60*a*–60*c* over one of its 16 kbit/s lines 55. The 16 kbit/s switch 120 at the Mobile Switching Center 40 site will switch the other pair of channels to the second Base Station Controller 51 over one of its 16 kbit/s lines 126. A 16 kbit/s switch, not shown, in the second Base Station Controller 51 will then stitch them to the correct Base Transceiver Station, also not shown, under its control and which will be responsible for transmission to, and from, the Mobile Station 30 after completion of the handover.

Since every conversation involving this particular Mobile Station 30 must undergo a transformation from 16 kbit/s to 64 kbit/s, a TRAU 100 must be involved each time there is a transmission of speech or data to or from this Mobile Station 30. In those current approaches that use two separate TRAUs for handover between BTS1 60*a* to BTS2 60*b*, for example, responsibility for the speech coding would also be handed over from one TRAU 100 to another. Functionally this makes sense because the TRAU 100 is functionally part of the Base Transceiver Station 60*a*–60*c*.

However, the GSM specifications do allow the placement of the TRAU 100 at the Base Station Controller 50 site as shown in FIGS. 1 or 1*a*, or at the Mobile Switching Center as shown in FIGS. 2 or 2*a*, and some manufacturers do implement it in either of these fashions. In those prior approaches a separate TRAU 100 was still used for each Base Transceiver Station 60*a*–60*c*. In the present invention only one TRAU 100 will be used for handovers between the Base Transceiver Stations 60*a*–60*c* under the control of a single Base Station Controller 50, and the design will allow for distributed handover on the uplink.

Figure 3:
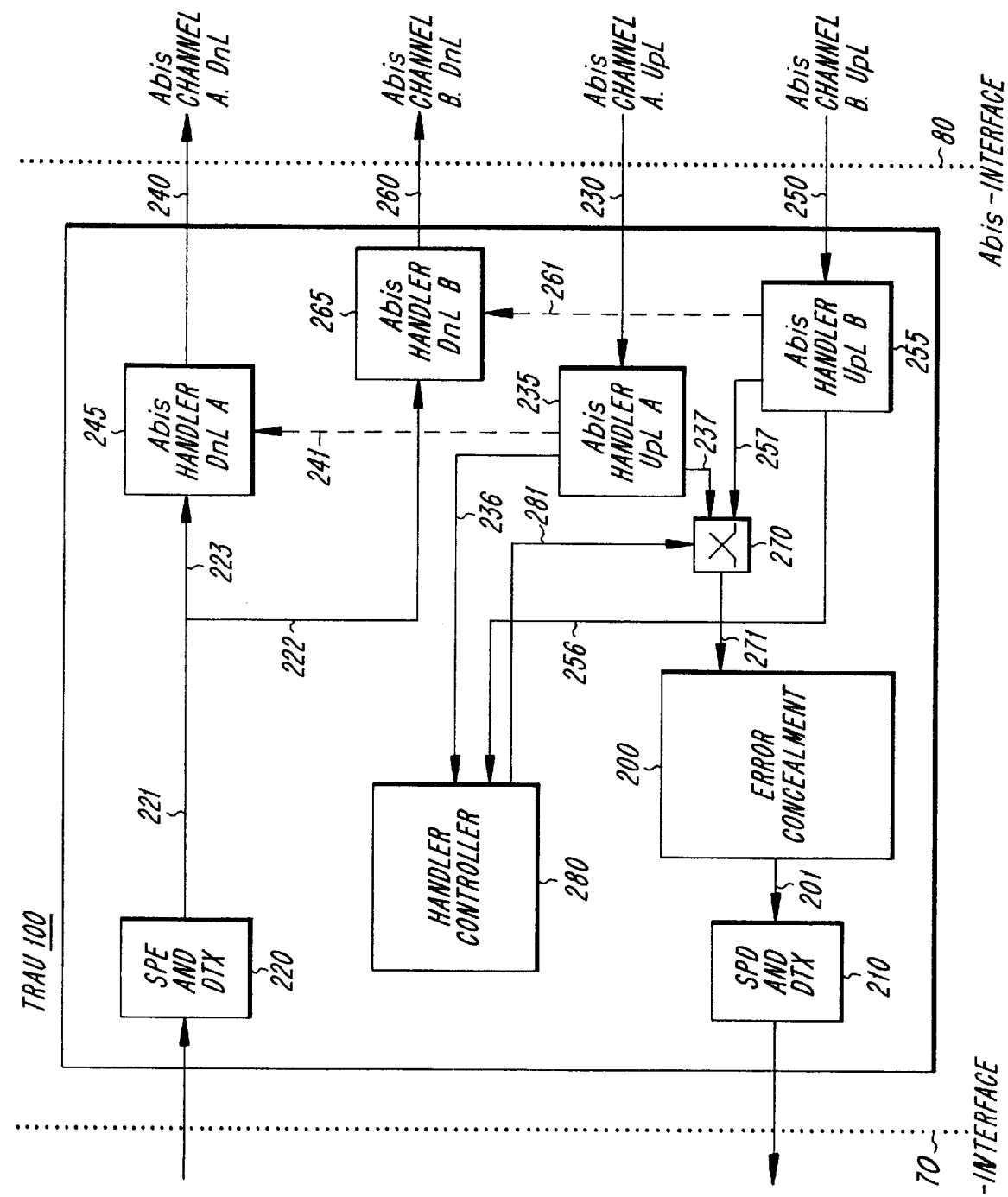
FIG. 3 is a diagram of the functional elements of the Transcoder and Rate Adaptation Unit ("TRAU") according to the present invention.

FIG. 3 shows a diagram of the design of the TRAU 100 according to the present invention. The various elements include a Speech Encoder ("SPE") and Discontinuous Transmission ("DTX") unit 220 which perform speech encoding on the downlink transmission. Also shown is a Speech Decoder ("SPD") and DTX unit 210 which perform speech decoding on the uplink transmission. Some digital mobile communications systems such as GSM use the Discontinuous Transmission technique. It is also known sometimes as "variable bit rate". It aims to increase system efficiency through a decrease in the interference level, by inhibiting the transmission of the radio signal during speech pauses.

A choice is made by the system on a call per call basis of whether to transmit in normal mode or DTX mode. This is because the DTX mode slightly deteriorates the quality of transmission, in particular when used on both the uplink and downlink. In the DTX mode, the goal is to encode speech at a higher rate when the user is effectively speaking, 13 kbit/s in GSM, and otherwise at a lower bit rate, around 500 bit/s in GSM.

This low rate is sufficient to encode the background noise, which is regenerated for the listener to avoid him or her thinking that the connection is broken. This is the notion of "comfort noise". Experience has shown that a listener is greatly disturbed when the background noise behind the speech suddenly stops. A means to avoid this disturbance is to generate an artificial noise when no signal is received. The characteristics of the background noise during the conversation are updated regularly and transported by specific frames called Silence Descriptor Frames ("SID")

The Speech Decoder 210 and Speech Encoder 220 also perform coding on the speech samples according to different algorithms which are not essential to the present invention. The speech is sliced into 20 ms segments, digitized and coded to be sent over a certain channel with additional information added, for a total of 260 bits in GSM. After encoding the downlink signal, the Speech Encoder 220 sends the signal out on one line 221 which subsequently divides into two lines 222, 223, that go to the Abis Handler DnL A 245 and Abis Handler DnL B 265 respectively. In the embodiment shown here the signal is merely divided, duplicate copy being sent on to both Handlers 245, 265. As seen in the embodiment in FIG. 3, the signal being sent over both Abis Channel A, DnL (240 FIG. 3) and Abis Channel B. DnL (260 FIG. 3) will be identical.

The channel concept is a key concept in systems using a TDMA method, such as GSM. A stream of bits carried over a carrier frequency is divided sequentially into "frames". The frames are then divided into "timeslots", eight timeslots in GSM. One timeslot of a TDMA-frame on one carrier frequency is referred to as a "physical channel". Consequently, there are eight physical channels per carrier frequency, or just "carrier", in GSM. The information sent during one timeslot is called a burst.

A great variety of information must be transmitted between the Base Transceiver Station and the Mobile Station, e.g. user data and control signalling. Depending on the type of information that must be transmitted, we refer to different "logical channels". These logical channels are mapped onto the physical channels. For example, in GSM, speech is sent on the logical channel "Traffic Channel," which during the transmission is allocated a certain physical channel.

Also seen in FIG. 3 is an Error Concealment module 200 which is responsible for implementing various algorithms to mask lost speech frames. In addition, there are four Abis Handlers 235-245-255-265 which are responsible for aligning the phase of the speech coding to the Air Interface to decrease the delay. The Abis Handlers 235-245-255-265 also handle synchronization of frames from the Base Transceiver Stations.

Although the embodiment shown in FIG. 3 shows four Abis Handlers 235-245-255-265, it is a functional separation. There are two separate physical units, a Channel A Abis Handler which is composed of the two functional subunits Abis Handler DnL A 245 and Abis Handler UpL A 235, and a Channel B Abis Handler which is composed of the two functional subunits Abis Handler DnL B 265 and Abis Handler UpL B 255. The connection of Abis Handler DnL A 245 and Abis Handler UpL A 235 into one unit is shown by the first dashed line 241. The connection of Abis Handler DnL B 265 and Abis Handler UpL B 255 into one unit is shown by the second dashed line 261.

Also included in the TRAU 100 is a Handler Controller 280 and a switch 270. Abis Handler UpL A 235 has an input 237 to the switch 270 and Abis Handler UpL B 255 also has an input 257 to this switch 270. In addition, Abis Handler UpL A 235 has an input 236 to the Handler Controller 280 and Abis Handler UpL B 255 also has an input 256 to this Handler Controller 280. In turn, the Handler Controller 280 has an input 281 into the switch 270.

At the beginning of the present method, a Mobile Station (30 FIG. 1) is transmitting speech frames to, and receiving speech frames from, a first Base Transceiver Station (60a FIG. 1). Before a Handover is initiated, speech frames will be received in the transcoder and rate adaptation unit (100 FIG. 3) from the first Base Transceiver Station (60a FIG. 1) on Abis Channel UpL A 230 and sent to Abis Handler UpL A 235 for synchronization. Abis Handler UpL A 235 will then send these frames to the switch 270 and the Handler Controller 280. Since there is no input to the Handler Controller 280 from Abis Handler UpL B 255 at this time, the Handler Controller 280 will instruct the switch 270 to allow only the signal from Abis Handler UpL A 235 to pass through the switch 270 to the Error Concealment module 200 through its input (271 FIG. 3). The Error Concealment module 200 then sends this signal on through its input (201 FIG. 3) to the Speech Decoder 210.

After a Handover is initiated, transmission will begin to the TRAU 100 from a second Base Transceiver Station (60b FIG. 1) over Abis Channel UpL B (250 FIG. 3). During the performance of a handover according to the present invention there will be transmissions from the two involved Base Transceiver Stations (60a, 60b FIG. 1) on both Abis Channel A UpL 230 and Abis Channel B UpL 250. After Abis Handler UpL A 235 and Abis Handler UpL B 255 both perform their synchronization they will forward the signals to the Handler Controller 280 and the switch 270. The Handler Controller 280 will then check various quality measurements on these signals, using various quality measurement means not essential to the present invention, and decide which signal to pass through the switch 270.

Before the Mobile Station (30 FIG. 1) switches to the second Base Transceiver Station (60b FIG. 1), the speech frames it is transmitting to the first Base Transceiver Station (60a FIG. 1) will be sent over Abis Channel UpL A 230 to Abis Handler UpL A 235 and on to the switch 270 and the Handler Controller 280. These speech frames will have a Bad Frame Indicator ("BFI") flag which will indicate to the Handler Controller 280 that these are valid speech frames (BFI=0). As a result, the Handler Controller 280 will control the switch to pass the signal from Abis Handler UpL A 235. After the Mobile Station (30 FIG. 1) switches it will begin transmitting to the second Base Transceiver Station (60b FIG. 1). These speech frames will then be sent cover Abis Channel UpL B 250 to Abis Handler UpL B 255 and on to the switch 270 and the Handler Controller 280. These speech frames will have a Bad Frame Indicator flag which will indicate to the Handler Controller 280 that these are valid speech frames (BFI=0). At the same time, Abis Handler UpL A 235 will receive speech frames from the first Base Transceiver Station (60a FIG. 1) with a Bad Frame Indicator flag indicating invalid speech frames (BFI=1). As a result, the Handler Controller 280 will control the switch 270 to switch to Abis Handler UpL B 255 and allow only the signal from Abis Handler UpL B 255 to pass, and not the frames from Abis Handler UpL A 235. Although the Handler Controller 280 may use a Bad Frame Indicator flag to control the switching, it may also use any of a number of other quality indicators dependent on the particular implementation. The specific quality indicators are not the subject of the present invention which will work using any of these measurements in the Handler Controller 280.

Figure 4A:
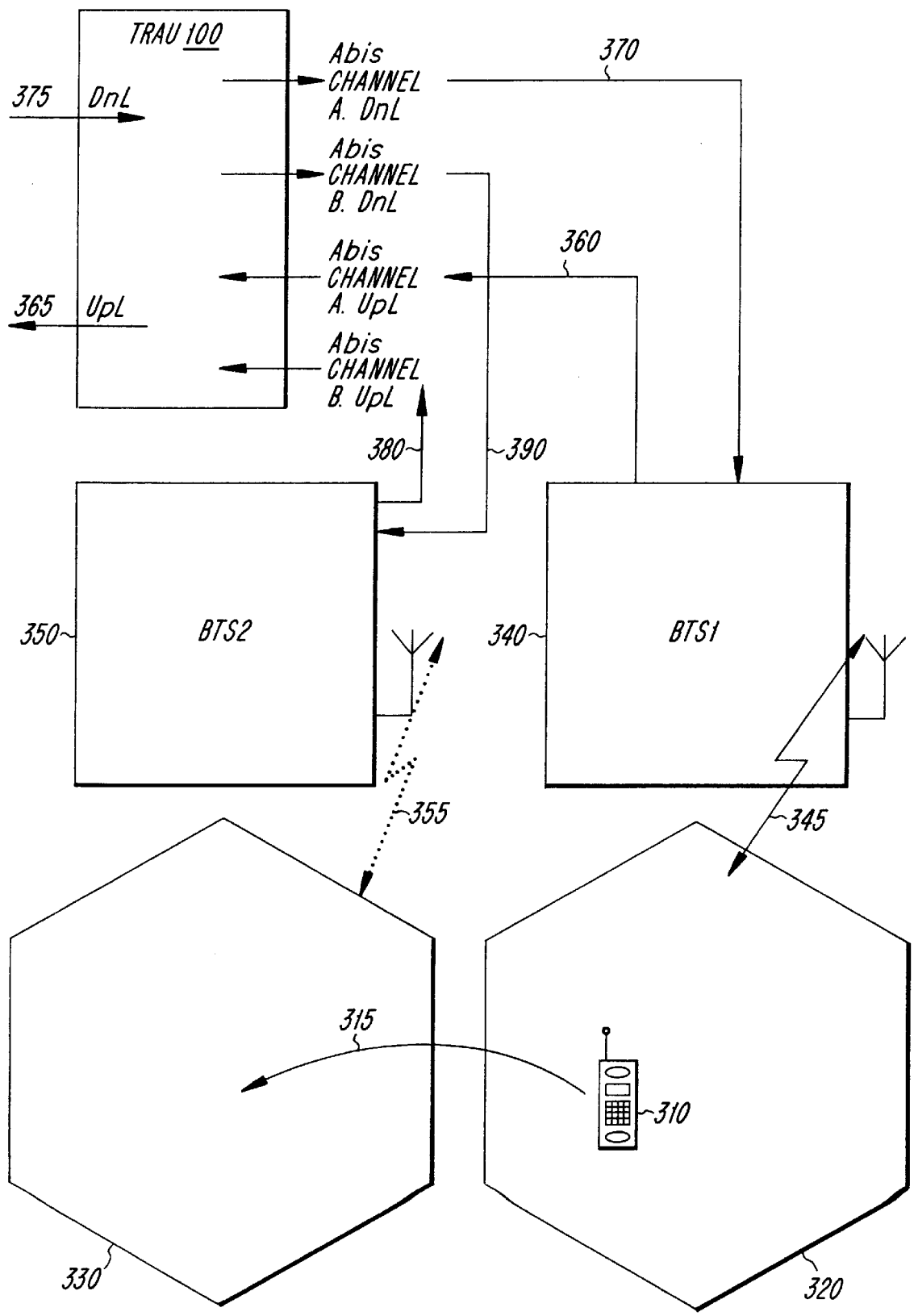
FIG. 4a is a diagram of the allocation of channels during an intercell handover.

In FIG. 4a is shown the situation for an "intercell" handover. We will assume that a Mobile Station 310 is transmitting and receiving on a carrier frequency 345 which contains either speech or data. The Mobile Station 310 is in Cell One 320, covered by a Base Transceiver Station called BTS1 340. Initially, the TRAU 100 is allocated to BTS1 340. TRAU 100 speech frames sent to and from the Mobile Station 310 are received and delivered on Abis Channel A 360-370, which is composed of both a downlink and an uplink portion.

The direction of transmission from a Base Transceiver Station, e.g. BTS1 340, to the Mobile Station 310 is defined as the downlink and the opposite direction as the uplink. For Abis Channel A 360-370, the uplink portion is Abis Channel A UpL 360 and the downlink portion is Abis Channel A DnL 370.

Similarly, Abis Channel B 380-390 is composed of both a downlink and an uplink portion. The uplink portion is Abis Channel B UpL 380 and the downlink portion is Abis Channel B DnL 390. At this time Abis Channel B 380-390 is not connected to a Base Transceiver Station and a subrate idle pattern is sent over that channel.

When the Mobile Station 310 roams 315 into another cell, here Cell Two 330, covered by another BTS, in this case call it BTS2 350, the Base Station Controller, see BSC 50 FIGS. 1, 1a, 2 or 2a, might make a decision to perform a handover from BTS1 340 to BTS2 350. Thus, the BTS-old as discussed previously is here BTS1 340, and the BTS-new is BTS2 350. The decision made by the Base Station Controller can be based on any of a number of parameters and is not the subject of the present invention.

Figure 4B:
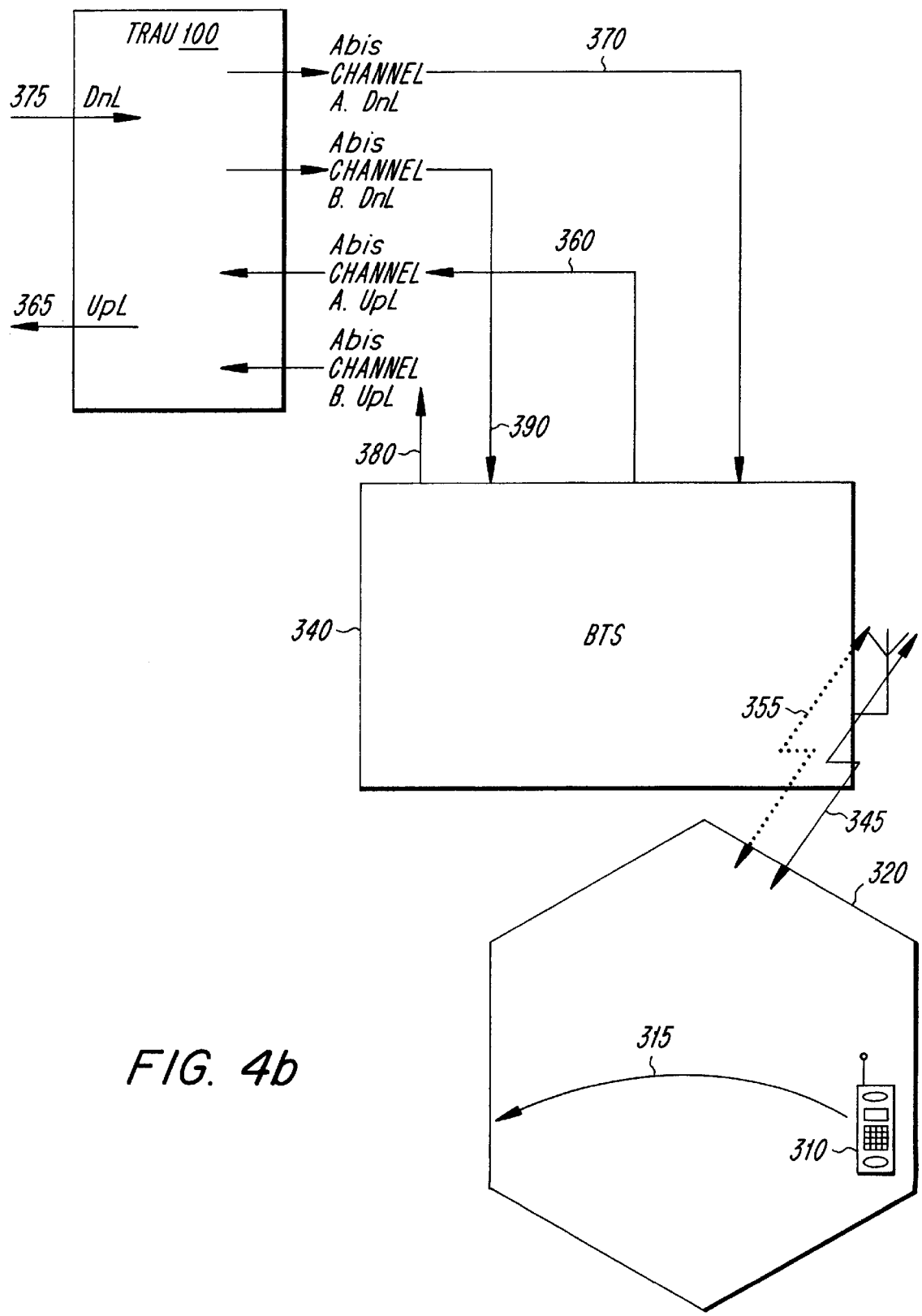
FIG. 4b is a diagram of the allocation of channels during an intracell handover.

In FIG. 4b is shown the situation for an "intracell" handover. The situation is similar to that of FIG. 4a except there is only one Base Transceiver Station, BTS 340, which performs the handover within the same cell (i.e. "intracell"). This BTS 340 contains both the Abis Channel A 360-370 and the Abis Channel B 380-390. Rather than handover from Abis Channel A 360-370 in one Base Transceiver Station to Abis Channel B 380-390 in another Base Transceiver Station, the handover is performed from Abis Channel A 360-370 to Abis Channel B 380-390 within this particular BTS 340.

Figure 5:
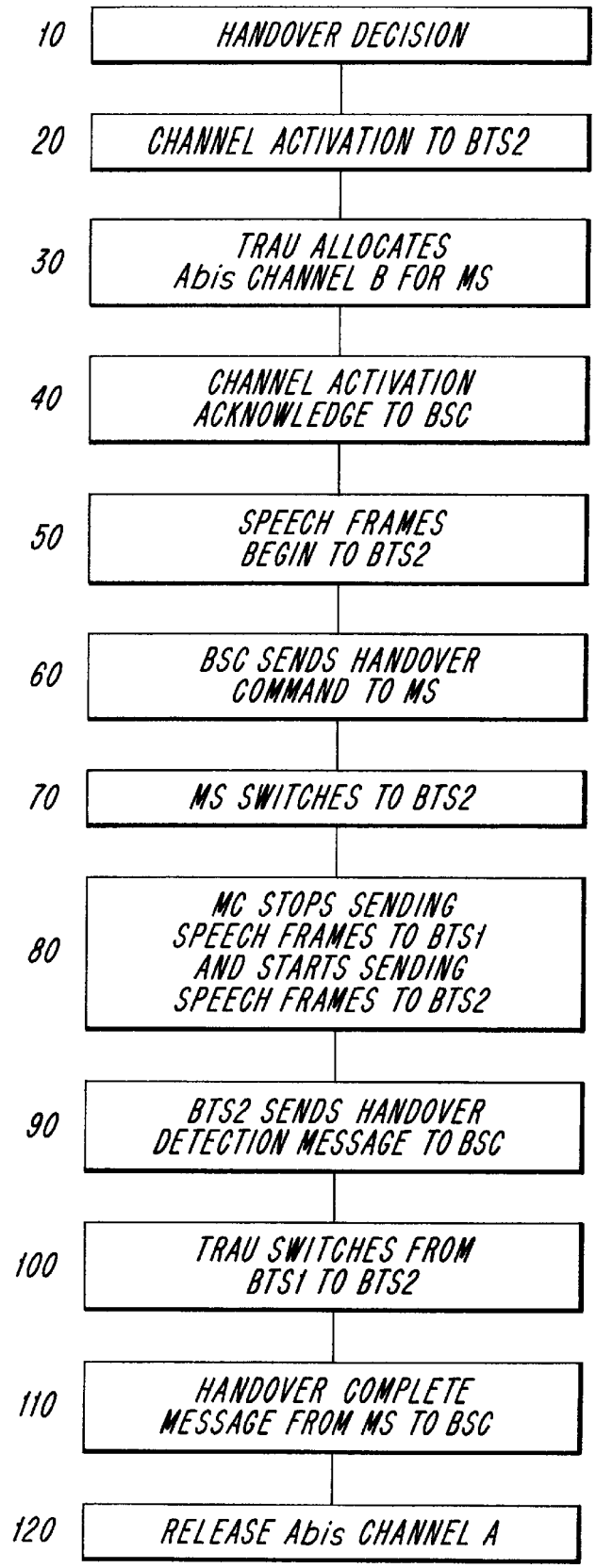
FIG. 5 is a flowchart illustrating the steps of the method performed according to the present invention.

In FIG. 5 is shown a flowchart of the method for a handover according to the present invention as applied to a GSM mobile communications system. Reference will also be made to FIG. 4a, the intercell handover, as the procedure in FIG. 5 is followed. After a decision is made to perform a handover, block 10, by the Base Station Controller, the Base Station Controller sends a CHANNEL ACTIVATION message, block 20, to BTS2, see BTS2 350 in FIG. 4a. A CHANNEL ACTIVATION message is a simple request and acknowledgment procedure which contains information specifying the transmission mode, the cipher mode and the downlink and uplink continuous transmission mode. In addition, it contains the information needed by the Mobile Station 310 for access and the first power control settings.

The BTS2 350, upon reception of this CHANNEL ACTIVATION message, starts in-band information exchanges over Abis Channel B 380-390, FIG. 4a, with the TRAU 100, to set the basic transmission mode and the discontinuous transmission modes; this is the point where synchronization of the Mobile Station 310 with the TRAU 100 normally starts. Next, the TRAU 100 simply allocates, block 30 FIG. 5, Abis Channel B 380-390 for the handover.

Once Abis Channel B 380-390 is allocated, block 30, a CHANNEL ACTIVATION ACKNOWLEDGE message, block 40 FIG. 5, is sent from BTS2 350 to the Base Station Controller. The path through Abis Channel A 360-370, FIG. 4a, is not released yet. This allows the Mobile Station 310 to go back to Abis Channel A 360-370 should the handover fail.

On Abis Channel B DnL 390 the TRAU 100 starts sending TRAU speech frames, block 50 FIG. 5, to the BTS2 350. This is done as an acknowledgment to speech frames received from BTS2 350 in Abis Handler UpL B 255 FIG. 3. The speech information in these speech frames to BTS2 350 over Abis Channel B DnL 390 is identical to that in the speech frames still being sent to BTS1 340 over Abis Channel A DnL 370. Thus, speech frames are transmitted in parallel in the downlink direction to both BTS1 340 and BTS2 350 and then to the Mobile Station 310. However, at this time the Mobile Station 310 is only tuned to the frequency broadcast by BTS1 340 and is not actually receiving the signal broadcast by BTS2 350.

The phase of the speech coding is unchanged, i.e. aligned to the phase of the BTS1 340 using a Time Alignment procedure. The contents of the uplink frames from the BTS2 350 along Abis Channel B UpL 380 will not contain any usable data at this time. The data sent to the speech decoder, see SPD 210 FIG. 3, still comes from BTS1 340.

The Base Station Controller then sends a HANDOVER COMMAND as specified in GSM, block 60 FIG. 5, to the Mobile Station 310 via BTS1 340 over Abis Channel A DnL 370, FIG. 4a. It is optional to control, through this message, the Mobile Station 310 so that it either sends RACH bursts or not. In the present embodiment, it is assumed that the RACH sending is turned off. The Mobile Station 310 will then switch, block 70 FIG. 5, to BTS2 350 by means of its own circuitry when receiving the HANDOVER COMMAND.

The reception of speech frames from the Mobile Station 310 will then stop, block 80 FIG. 5, at BTS1 340. This will be indicated to the TRAU 100 by the reception of a Bad Frame Indication ("BFI")-flag along Abis Channel A UpL 360, and the TRAU 100 will start muting the frame according to an Error Concealment algorithm. This Error Concealment algorithm can be one such as that in PCT/SE96/00311, "Arrangement and Method Relating to Speech Transmission and a Telecommunications System Comprising Such Arrangement", the subject matter of which is incorporated herein as a reference. At the reception, block 80 FIG. 5, by BTS2 350 of the first correctly decoded signalling or traffic channel ("TCH") frame from the Mobile Station 310, BTS2 350 will send a HANDOVER DETECTION message as specified in GSM, block 90 FIG. 5, to the Base Station Controller.

In the case where the quality measures in the TRAU indicate, for example where BFI=0, the TRAU 100 will switch, block 100 FIG. 5, from BTS1 340 to BTS2 350 and send the TRAU speech frame contents to the Error Concealment block, see Error Concealment 200 FIG. 3. At that point of time the Speech Decoder, see SPD 210 FIG. 3, is either sending partly muted speech in the case of a short interruption or silence, or possibly comfort noise if a suitable algorithm is implemented, in the case of a longer interruption. The speech could then be ramped up or decoded without modification. At this point of time the Abis Channel B DnL 390 will receive the control of the speech coding phase, i.e. the alignment to the air interface timing of BTS2 350 could now be achieved.

Next, a HANDOVER COMPLETE message, as specified in GSM, is sent from the Mobile Station 310 to the Base Station Controller, block 110 FIG. 5, which will release the channel on BTS1 340, disconnect Abis Channel A 360-370, block 120 FIG. 5, and mark it as idle and ready to be used in a new handover. A sub-rate idle pattern is now sent on Abis Channel A 360-370.

The method shown in FIG. 5 was discussed above as applied to an intercell handover as shown in FIG. 4a. The method, however, works equally as well for intracell handovers as shown in FIG. 4b. The difference in the method is that the functions of BTS2 in an intercell handover are performed by the same BTS in an intracell handover. For example, the ChL Activation to BTS2, block 20 FIG. 5, would be a channel activation to another channel within the same BTS in an intracell handover. When Speech Frames Begin to BTS2, block 50 FIG. 5, in an intercell handover, the correspondence in an intracell handover is that speech frames begin on the newly activated channel in the same BTS.

Further, when the Mobile Station switches to BTS2, block 70 FIG. 5, in an intercell handover, the corresponding action in an intracell handover is that the Mobile Station merely switches to the newly activated channel being transmitted on by the same BTS. The Mobile Station will then stop sending speech frames to the old channel in the BTS and start sending speech frames to the new channel in the same BTS, corresponding to the similar action for an intercell handover, block 80 FIG. 5.

The same BTS will then send the Handover Detection message, rather than BTS2 in an intercell handover, block 90 FIG. 5. The TRAU will then switch from one channel to another within the same BTS, rather than from BTS1 to BTS2 as in the intercell handover, block 100 FIG. 5. The final difference between intercell and intracell handover is the channel release. In an intercell handover Channel A must be released on BTS1, block 120 FIG. 5, while in an intracell handover Channel A is just another channel within the same BTS that must be released.

Figure 6:
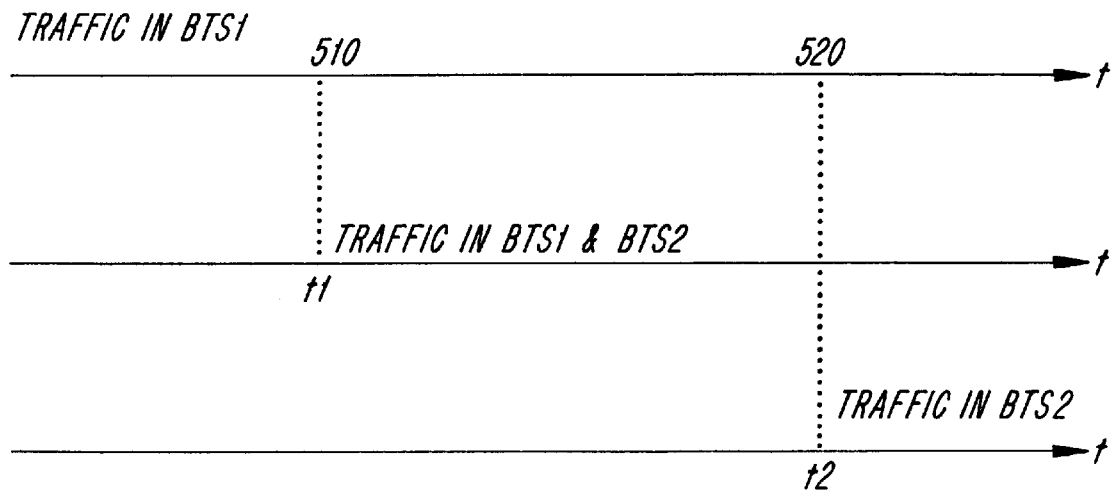
FIG. 6 is a timechart illustrating the flow of traffic in the channels as the method of the present invention is performed.

In FIG. 6 is shown an overview of the timing of the handover in the present invention. Up to time t1 510 speech traffic is being generated only to BTS1. After the receipt of the HANDOVER COMMAND, a new channel is opened up to BTS2 at time t1 510. After time t1 510 traffic is being generated on channels to both BTS1 and BTS2. After the HANDOVER DETECT message is received, the channel to BTS1 is released at time t2 520 and traffic is generated only to BTS2.

Figure 7:
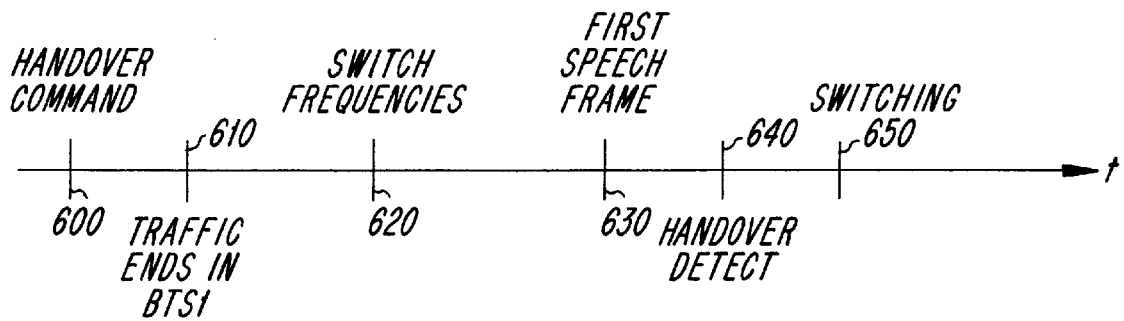
FIG. 7 is a more detailed timechart illustrating the timing of various events of the method of the present invention.

In FIG. 7 is shown a more detailed overview of the timing of the handover in the present invention. The timing here begins with the Handover Command 600 sent to the Mobile Station from the Base Station Controller. The Base Station Controller steals 20 ms of speech on the traffic channel in the downlink in order to send this command. After a short delay, Traffic Ends in BTS1 610 as the Mobile Station is preparing to Switch Frequencies 620 to the frequency for BTS2. After the Mobile Station stops transmitting to BTS1 610 there is a short delay before Switching Frequencies 620 which is caused by the timing differences from the Mobile Station to BTS1 and BTS2. The Mobile Station must align its multiframe timing with that of BTS2. The delay can be as little as 0 ms, if the transmission time to BTS1 and BTS2 are identical, up to 20 ms for a full multiframe.

After the Mobile Station Switches 620 to the new frequency and starts transmitting to BTS2 there is a further delay before the First Speech Frame 630 is processed. This delay is due to interleaving. In GSM it is fixed and is equal to 8 bursts totalling approximately 4.6 ms.

The First Speech Frame 630 can be either 20 ms of speech or a Handover Complete Message, as described in FIG. 5, which steals 20 ms of speech from the traffic channel.

Since the Switching 650 is based on the Handover Detect Message 640, the problem is that the time varies between the actual switching point and the optimal switching point. This is caused by three things: one, the variation in time between detecting the Handover 640 in the Base Transceiver Station in relation to the first received speech frame; two, the variation in time for the Base Station Controller to receive the Handover Detect 640 from BTS2 due to message queuing, signal delay, etc.; and three, the variation in time for the Base Station Controller to execute the switch due to central processor load, signal delay, etc.

In a synchronous handover with no Random Access Channel bursts the Base Transceiver Station will use the decoding of a correct Fast Associated Control Channel block or a correct Traffic Channel block for detecting the Handover. A Random Access Channel (RACH) is a channel used by the Mobile Station to request allocation of a control channel for signalling during setup of the call at BTS2. The Fast Associated Control Channel (FACCH) is actually a use of the Traffic Channel on the uplink where 20 ms bursts of speech, or data, are stolen for signalling purposes.

The use of a Traffic Channel or a Fast Associated Control Channel block is implementation specific in the Mobile Station. The delay in this case is due to the length of this block, which will be 20 ms in a full-rate Traffic Channel and 40 ms in a half-rate Traffic Channel.

In a synchronous handover using Random Access Channel bursts the Base Transceiver Station will use the decoding of correct Random Access Channel bursts for detecting the Handover. It is implementation specific in the Mobile Station if the first block it sends after the Random Access Channel bursts is a Fast Associated Control Channel or a Traffic Channel. This also means a delay of 20 ms for a full-rate Traffic Channel and 40 ms for a half-rate Traffic Channel.

For non-synchronous handovers the Base Transceiver Station uses the decoding of correct Random Access Channel bursts from the Mobile Station to detect the handover. The Base Transceiver sends the physical information (e.g. timing information) to the Mobile Station. It is then implementation specific in the Mobile Station as to how long it takes until it sends the first Traffic Channel or Fast Associated Control Channel. The delays here will include 20 ms for a full-rate channel or 40 ms for a half-rate channel plus the implementation-specific delay in the Mobile Station.

Since different Handover types (e.g. synchronous and non-synchronous) can co-exist in a network, considerable variations are added if the Base Station Controller just switches on Handover Detect 640 without any specific timers for each type of Handover. This would add considerably to the complexity to the software in the Base Station Controller.

The embodiment described serves as illustration and not as limitation. It will be apparent to one of ordinary skill in the art that departures may be made from the embodiment described above without departing form the spirit and scope of the invention. Therefore, the invention should not be regarded as being limited to the examples described, but should be regarded instead as being equal in scope to the following claims.

What is claimed is:

1. A transcoder and rate adaptation unit comprising:
   an encoding part for encoding a downlink signal; and
   a decoding part for decoding an uplink signal,
   wherein said transcoder and rate adaptation unit is capable of simultaneously transmitting said downlink signal on two separately controlled downlink channels and is capable of receiving two uplink signals on two separately controlled uplink channels,
   wherein further, said transcoder and rate adaptation unit further includes:
   a switching means for the selection of one of said two uplink signals;

a first handling means for handling said downlink signal and a first of said two uplink signals on a first communication channel; and a second handling means for handling said downlink signal and a second of said two uplink signals on a second communication channel.

2. The transcoder and rate adaptation unit of claim 1, further comprising:

a controlling means, said controlling means having an evaluating means for evaluating quality indications from said two uplink signals, and said controlling means controlling said switching means based on said quality evaluations on said two uplink signals.

3. The transcoder and rate adaptation unit of claim 1, wherein:

said transcoder and rate adaptation unit is located in a base station controller in a mobile system to deliver telecommunication signals between a switching center and a mobile radio station over said first communication channel by means of one of at least two radio units controlled by said base station controller which contains a radio unit controlling means, said base station controller controlling said transcoder and rate adaptation unit in the performance of a handover from said first communication channel to said second communication channel.

4. The transcoder and rate adaptation unit of claim 1, wherein:

said transcoder and rate adaptation unit is located in a mobile switching center in a mobile radio system to deliver telecommunications signals between a public switched telephone network and mobile radio station over said first communication channel by means of one of at least two radio units controlled by a base station controller which contains a radio unit controlling means, said base station controller controlling said transcoder and rate adaptation unit in the performance of a handover from said first communication channel to said second communication channel.

5. A mobile radiocommunication system, comprising:

a base station sub-system including radiocommunication equipment for managing transmission paths between a mobile radio station and a switching center;

said switching center, coupled to said base station sub-system, for managing communications between said base station and said mobile radio station; and a transcoder and rate adaptation unit comprising:
an encoding part for encoding a downlink signal; and
a decoding part for decoding an uplink signal,
wherein said transcoder and rate adaptation unit is capable of simultaneously transmitting said downlink signal on two separately controlled downlink channels and is capable of receiving two uplink signals on two separately controlled uplink channels, wherein further, said transcoder and rate adaptation unit further includes:

a switching means for the selection of one of said two uplink signals;

a first handling means for handling said downlink signal and a first of said two uplink signals on a first communication channel; and a second handling means for handling said downlink signal and a second of said two uplink signals on a second communication channel.

6. The mobile radiocommunication system of claim 5, wherein:

said base station sub-system comprises a base station controller; and said transcoder and rate adaptation unit is located in said base station controller to deliver telecommunication signals between said switching center and said mobile radio station over said first communication channel by means of one of at least two radio units controlled by said base station controller which contains a radio unit controlling means, said base station controller controlling said transcoder and rate adaptation unit in the performance of a handover from said first communication channel to said second communication channel.

7. The mobile radiocommunication system of claim 5, wherein:

said base station sub-system comprises a base station controller; and said transcoder and rate adaptation unit is located in said switching center to deliver telecommunications signals between a public switched telephone network and said mobile radio station over said first communication channel by means of one of at least two radio units controlled by a base station controller which contains a radio unit controlling means, said base station controller controlling said transcoder and rate adaptation unit in the performance of a handover from said first communication channel to said second communication channel.

8. A transcoding and rate adapting method for use in a radiocommunication system, said method comprising the steps of:

encoding a downlink signal;

decoding an uplink signal;

simultaneously transmitting said downlink signal on two separately controlled downlink channels;

receiving two uplink signals on two separately controlled uplink channels;

selecting one of said two uplink signals;

handling said downlink signal and a first of said two uplink signals on a first communication channel; and handling said downlink signal and a second of said two uplink signals on a second communication channel.

* * * * *